United States Patent Office 3,283,037
Patented Nov. 1, 1966

3,283,037
BIS(CYCLIC 2,2-DIMETHYLTRIMETHYLENE) 1,4-CYCLOHEXANEDIMETHYLENE PHOSPHITE
Herman E. Davis, Kingsport, Tenn., assignor to Eastman Kodak Company, Rochester, N.Y., a corporation of New Jersey
No Drawing. Filed Sept. 12, 1963, Ser. No. 308,369
9 Claims. (Cl. 260—927)

This invention relates to organic chemistry. More particularly, it relates to phosphite compounds.

Various phosphite compounds have been found useful as preservatives for various plastic materials. However, many of these phosphites are not thermally stable. Thermal stability of additives for plastic materials is important because of the high temperatures usually involved in making the plastic materials into useful articles. This invention provides a phosphite compound having thermal stability.

In summary, this invention comprises as a new composition of matter the compound bis(cyclic 2,2-dimethyltrimethylene) 1,4 - cyclohexanedimethylene phosphite. This new compound is represented by the following structural formula:

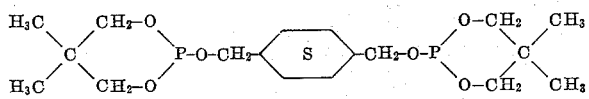

It is a heterocyclic compound which exhibits geometric isomerism. The trans isomer is a white, crystalline solid having a melting point of 103–104° C. The cis isomer at 20–25° C. is a white, waxy solid.

Both the trans and cis isomers of this compound are characterized by exceptionally high thermal stabilities at temperatures up to 270° C. Indeed, their thermal stabilities are far greater than the thermal stabilities of related phosphites. For example, 1–2 gram samples of each of the following phosphites, when placed in separate test tubes (18 x 250 milliliters), open to air, and aged at 270° C., gave the following results. The sample of trans bis(cyclic 2,2-dimethyltrimethylene) 1,4-cyclohexanedimethylene phosphite after 30 minutes had not changed color and gave no indication under infrared analysis of decomposition or structural change. The sample of cis bis(cyclic 2,2-dimethyltrimethylene) 1,4-cyclohexanedimethylene phosphite gave results similar to those of the sample of the trans isomer. A mixture of the cis and trans isomers of bis(cyclic 2,2-dimethyltrimethylene) 1,4-cyclohexanedimethylene phosphite gave results similar to those obtained with the pure isomers. On the other hand, the sample of bis(cyclic 2,2-dimethyltrimethylene) 2,2-dimethyl-1,3-propanediol phosphite completely decomposed in 15 minutes while the sample of bis(cyclic 2,2-dimethyltrimethylene) 2,2,4,4 - tetramethylcyclobutylene phopshite had completely decomposed in 12 minutes. Hence, cis and trans isomers of bis(cyclic 2,2-dimethyltrimethylene 1,4-cyclohexanedimethylene phosphite are substantially more stable to heat than related phosphites.

The compound of this invention is made by heating a mixture consisting essentially of neopentyl phenyl phosphite and 1,4-cyclohexanedimethanol and a catalyst quantity of a basic catalyst. To obtain the trans isomer, trans 1,4-cyclohexanedimethanol is used in the reaction. To obtain the cis isomer, cis 1,4-cyclohexanedimethanol is employed in the reaction. To obtain an isomeric mixture, an isomeric mixture of 1,4-cyclohexanedimethanol is employed. Preferably, the neopentyl phenyl phosphite and the 1,4-cyclohexanedimethanol are initially present at a mole ratio of substantially 2:1. Preferably, during the reaction, phenol is removed from the reaction mixture. When substantially one mole of phenol for every mole of neopentyl phenyl phosphite initially present has been removed, the reaction has gone to completion. The reaction mixture thereby obtained consists essentially of bis(cyclic 2,2-dimethyltrimethylene) 1,4-cyclohexanedimethylene phosphite and the catalyst. For many purposes, the reaction mixture, or crude product, can be "used as is." For other uses, however, where a pure product is desired, the reaction product can be purified by crystallization from a suitable solvent such as hexane. Both the crude reaction product and recrystallized reaction product are stable at temperatures up to 270° C.

Both cis and trans isomers of this compound are useful as thermal stabilizers of plastic and other organic materials.

Thus, when a trans isomer or a cis isomer or a mixture of trans and cis isomers of the compound of this invention is incorporated into a plastic material such as normally solid polypropylene, it functions as a stabilizer against thermal breakdown of the polypropylene and aids in maintaining the desired melt flow properties.

This invention is further illustrated by the following examples of various aspects thereof, including specific embodiments of this invention. This invention is not limited to these specific embodiments unless otherwise indicated.

Example 1

This example illustrates the preparation of trans bis(cyclic 2,2-dimethyltrimethylene) 1,4-cyclohexanedimethylene phosphite.

A mixture consisting essentially of 113 grams (0.5 mole) of neopentyl phenyl phosphite, 36 grams (0.25 mole) of trans 1,4-cyclohexanedimethanol and 0.4 gram of sodium methoxide is heated and phenol removed therefrom by distillation under reduced ambient pressure. Generally, the phenol begins to distill at a base temperature of 140° C. at 60 millimeters mercury pressure. The temperature gradually increases to 200° C. at 60 millimeters mercury pressure. The ambient pressure is then gradually lowered to 1 millimeter mercury pressure and the reaction mixture is held at this pressure and at 200° C. until no more phenol distills off from it. The reaction mixture thus obtained is the crude product. A typical yield of the crude product is 102 grams. After one recrystallization from hexane, a white crystalline solid is normally obtained. A typical melting point is 103–104° C. It is trans bis(cyclic 2,2-dimethyltrimethylene) 1,4-cyclohexanedimethylene phosphite.

Example 2

This example illustrates the preparation of cis bis(cyclic 2,2 - dimethyltrimethylene) 1,4 - cyclohexanedimethylene phosphite.

The procedure of Example 1 is followed except that cis 1,4-cyclohexanedimethanol is used instead of trans 1,4-cyclohexanedimethanol. The crystallized product thus obtained is a white, waxy solid at 20–25° C. It is cis bis(cyclic 2,2-dimethyltrimethylene) 1,4 - cyclohexanedimethylene phosphite.

Example 3

This example illustrates the preparation of an isomeric mixture of bis(cyclic 2,2-dimethyltrimethylene) 1,4-cyclohexanedimethylene phosphite.

113 grams (0.5 mole) of neopentyl phenyl phosphite, 36 grams (0.25 mole) of a mixture of 30% by weight cis and 70% by weight trans 1,4-cyclohexanedimethanol and 0.4 gram of sodium methoxide are mixed together and heated at an ambient pressure of 60 millimeters mercury pressure. At about 140° C., phenol begins to distill off from the reaction mixture. When the temperature reaches 200° C., the ambient pressure is gradually lowered to 1 millimeter mercury pressure and the reaction mixture is held at this temperature and pressure until no more phenol distills off from it. The reaction mixture is filtered to remove sodium methoxide. The product thereby obtained, upon cooling to 20–25° C., is typically a white solid having a melting point of 75–82° C. It is an isomeric mixture (substantially 30% by weight cis and 70% by weight trans) of bis(cyclic 2,2-dimethyltrimethylene) 1,4-cyclohexanedimethylene phosphite.

Other features, advantages and embodiments of this invention will be apparent to those in the exercise of ordinary skill in the art to which this invention pertains after reading the foregoing disclosures. In this regard, while this invention has been described in considerable detail relative to specific embodiments thereof, variations and modifications of these embodiments can be effected within the spirit and scope of the invention as disclosed and claimed.

I claim:
1. Bis(cyclic 2,2-dimethyltrimethylene) 1,4-cyclohexanedimethylene phosphite.
2. Trans bis(cyclic 2,2 - dimethyltrimethylene) 1,4-cyclohexanedimethylene phosphite.
3. Cis bis(cyclic 2,2-dimethyltrimethylene) 1,4-cyclohexanedimethylene phosphite.
4. Mixtures of cis and trans bis(cyclic 2,2-dimethyltrimethylene) 1,4-cyclohexanedimethylene phosphite.
5. A process for making a bis(cyclic 2,2-dimethyltrimethylene 1,4-cyclohexanedimethylene phosphite, which comprises heating a mixture of neopentyl phenyl phosphite, a 1,4-cyclohexanedimethanol and a basic catalyst at a catalytic concentration.
6. A process for making a bis(cyclic 2,2-dimethyltrimethylene) 1,4-cyclohexanedimethylene phosphite, which comprises heating a mixture consisting essentially of neopentyl phenyl phosphite, a 1,4-cyclohexanedimethanol at a 1:2 mole ratio relative to said neopentyl phenyl phosphite, and a basic catalyst at a catalytic concentration, whereby a reaction mixture comprising a bis(cyclic 2,2-dimethyltrimethylene) 1,4-cyclohexanedimethylene phosphite and phenol are formed; and distilling phenol from said reaction mixture at an ambient pressure less than atmospheric until substantially 1 mole of phenol for each mole of neopentyl phenyl phosphite has been removed therefrom.
7. A process for making a bis(cyclic 2,2-dimethyltrimethylene) 1,4-cyclohexanedimethylene phosphite, which comprises heating a mixture consisting essentially of neopentyl phenyl phosphite, a 1,4-cyclohexanedimethanol at a 1:2 mole ratio relative to said neopentyl phenyl phosphite, and a basic catalyst at a catalytic concentration, whereby a reaction mixture comprising a bis(cyclic 2,2-dimethyltrimethylene) 1,4 - cyclohexanedimethylene phosphite and phenol are formed; distilling phenol from said reaction mixture at an ambient pressure less than atmospheric until substantially 1 mole of phenol for each mole of neopentyl phenyl phosphite has been removed therefrom; and separating said catalyst from said bis(cyclic 2,2-dimethyltrimethylene) 1,4-cyclohexanedimethylene phosphite.
8. A process according to claim 7 wherein said 1,4-cyclohexanedimethanol is the trans isomer and said basic catalyst is sodium methoxide.
9. A process according to claim 7 wherein said 1,4-cyclohexanedimethanol is the cis isomer and the basic catalyst is sodium methoxide.

No references cited.

CHARLES B. PARKER, *Primary Examiner.*
FRANK M. SIKORA, *Assistant Examiner.*